United States Patent
Dietrich et al.

(10) Patent No.: US 7,478,386 B2
(45) Date of Patent: Jan. 13, 2009

(54) RESOURCE-CONSERVATIVE INSTALLATION OF COMPRESSED ARCHIVES

(75) Inventors: Jennifer R. T. Dietrich, Pflugerville, TX (US); Eric Philip Fried, Austin, TX (US); Susann Marie Keohane, Austin, TX (US); Virginia Ann Wigginton, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 11/121,131

(22) Filed: May 3, 2005

(65) Prior Publication Data

US 2006/0253631 A1    Nov. 9, 2006

(51) Int. Cl.
    *G06F 9/445* (2006.01)
(52) U.S. Cl. .............. 717/175; 717/177; 707/101; 707/104.1; 707/204
(58) Field of Classification Search .......... 710/68; 717/173, 174, 175; 707/200, 201, 204
    See application file for complete search history.

(56) References Cited

U.S. PATENT DOCUMENTS

| | | | | |
|---|---|---|---|---|
| 5,386,545 A * | 1/1995 | Gombos et al. | ............. | 707/204 |
| 5,768,597 A * | 6/1998 | Simm | ............. | 717/174 |
| 5,813,017 A * | 9/1998 | Morris | ............. | 707/204 |
| 5,999,740 A * | 12/1999 | Rowley | ............. | 717/173 |
| 6,003,044 A * | 12/1999 | Pongracz et al. | ............. | 707/204 |
| 6,075,943 A | 6/2000 | Feinman | ............. | 395/712 |
| 6,131,192 A * | 10/2000 | Henry | ............. | 717/175 |
| 6,144,960 A * | 11/2000 | Okada et al. | ............. | 707/10 |
| 6,418,554 B1 * | 7/2002 | Delo et al. | ............. | 717/174 |
| 6,427,149 B1 * | 7/2002 | Rodriguez et al. | ............. | 707/10 |
| 6,493,871 B1 * | 12/2002 | McGuire et al. | ............. | 717/173 |
| 6,523,166 B1 * | 2/2003 | Mishra et al. | ............. | 717/174 |
| 6,546,553 B1 * | 4/2003 | Hunt | ............. | 717/174 |
| 6,587,939 B1 * | 7/2003 | Takano | ............. | 712/210 |
| 6,675,382 B1 * | 1/2004 | Foster | ............. | 717/177 |
| 6,691,138 B1 * | 2/2004 | Kirkpatrick et al. | ............. | 707/204 |
| 6,751,795 B1 * | 6/2004 | Nakamura | ............. | 717/174 |
| 6,938,109 B1 * | 8/2005 | Sliger et al. | ............. | 710/68 |
| 7,350,207 B2 * | 3/2008 | Fisher | ............. | 717/178 |
| 2002/0143792 A1 * | 10/2002 | Belu | ............. | 707/200 |
| 2006/0123409 A1 * | 6/2006 | Jordan et al. | ............. | 717/174 |

OTHER PUBLICATIONS

McBrearty, "Method for Software Installation and Apply Once Update from a Single Image", IBM Technical Disclosure Bulletin, v38, n11, Nov. 1995, pp. 239-240.

* cited by examiner

*Primary Examiner*—Pierre M. Vital
*Assistant Examiner*—Christopher P Nofal
(74) *Attorney, Agent, or Firm*—Duke W. Yee; Matthew W. Baca; Theodore D. Fay, III

(57) ABSTRACT

Installing a payload file contained in a compressed archive of files using a minimum of memory. The payload file is directly installed onto a target data processing system without making additional copies of the particular file on the target data processing system and without intermediate expansion of the entire archive. The compressed archive of files contains an index indicating the location of files within the archive and a configuration logic section that allows an installation program to determine which files should be installed on which data processing systems and where the files should be installed.

4 Claims, 3 Drawing Sheets

RESOURCE-CONSERVATIVE INSTALLATION OF COMPRESSED ARCHIVES

BACKGROUND OF THE INVENTION

1. Technical Field

The present invention relates generally to an improved data processing system and in particular to a method and apparatus for processing data. Still more particularly, the invention relates to resource conservative installation of compressed archives.

2. Description of Related Art

As the complexity of software increases, the size of the installation image of software files also increases. Currently, floppy disks lack sufficient memory to be used as installation media for many software programs, essentially rendering floppy disks obsolete as installation media. Compact disks (CDs) and digital versatile disks (DVDs) provide sufficient memory for most software installation images, though multiple disks may be required and some data processing systems do not have CD drives or DVD drives. In addition, some installation images are downloaded directly over a network, such as the Internet. In this case, the size of an installation image can make downloading the entire installation image cost prohibitive in terms of the time required to download the installation image. Furthermore, the size of the installation image may make downloading the entire installation image impossible if the target device lacks sufficient available memory.

To reduce the size of an installation image and number of media required to hold an installation image, various compression techniques are used to compress the payload files of the installation image. A group of payload files are compressed and combined into a single archive file, which is usually much smaller than the original group of individual, uncompressed payload files. Later, when the installation image is to be installed, the archive file is uncompressed and the payload files installed on a target data processing system.

The process of decompressing and installing files from an archive file has required, in the past, much more space than the space required by the original archive files. Prior art decompression and installation techniques require that the installation image be downloaded or copied onto the target data processing system. The image is typically then decompressed into a temporary space, thus creating another copy of the payload data.

For example, an executable self-extracting archive file requires 10 megabytes (MB) to store. The archive file contains 25 MB of payload files when all payload files are decompressed. Decompressing the archive file and installing the payload files on the target data processing system requires an additional 40 MB of space because 25 MB are used for the payload files and 15 MB of space is used for temporary files used during the installation process. Thus, 50 MB of space is consumed to install 25 MB of payload files.

Once the program is installed on the target data processing system, the space requirements continue to grow when updates are applied. Updates are often larger than the original install image. Furthermore, if the update saves an old version of the program in order to preserve the capability of restoring the older version, then the space requirements grow even more. The problem becomes more frustrating when the target data processing system only needs to install a fraction of the payload files. Thus, a very large amount of space may be needed to decompress and install even one payload file stored in an archive file.

Some data processing systems have a very limited amount of available memory for these functions. For examples, PDAs, cell phones, and other devices containing small data processing systems may have very limited memory. Although these devices might benefit from installing a particular payload file contained in an archive file, installing the particular payload file may be impossible if the installation process requires more space than is available to the target data processing system.

Thus, it would be advantageous to have a method, process, and data processing system for minimizing the amount of memory required to extract, decompress, and install payload files from an archive file.

SUMMARY OF THE INVENTION

The present invention provides a method, apparatus and computer instructions for installing a particular file contained in a compressed archive file. The particular file is directly installed onto a target data processing system without making additional copies of the particular file on the target data processing system and without intermediate expansion of the entire archive. The archive of files contains an index that indicates the locations of files within the archive of files. The archive of files also contains a configuration logic section that allows an installation program to determine which files from among all files in the archive should be installed on a data processing system and, optionally, where the files should be installed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
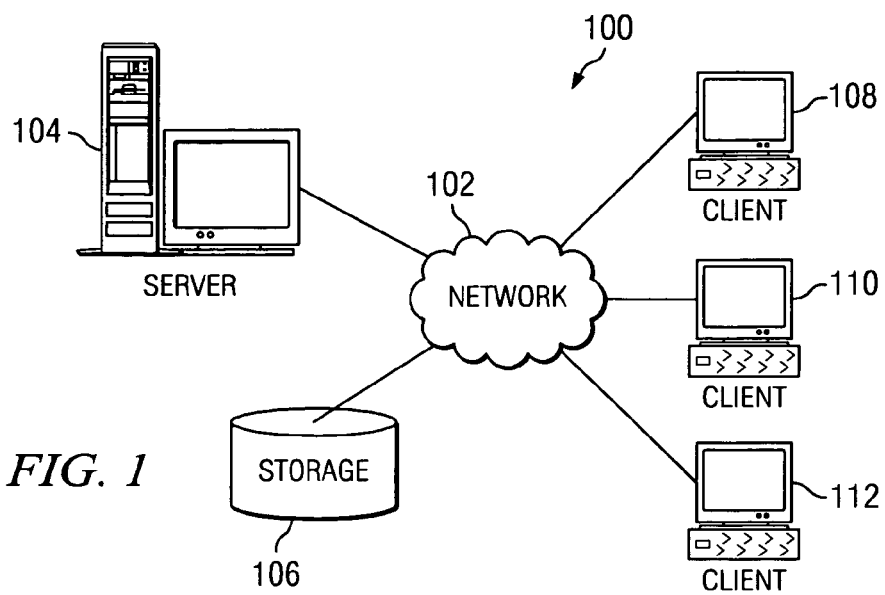
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110, and 112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
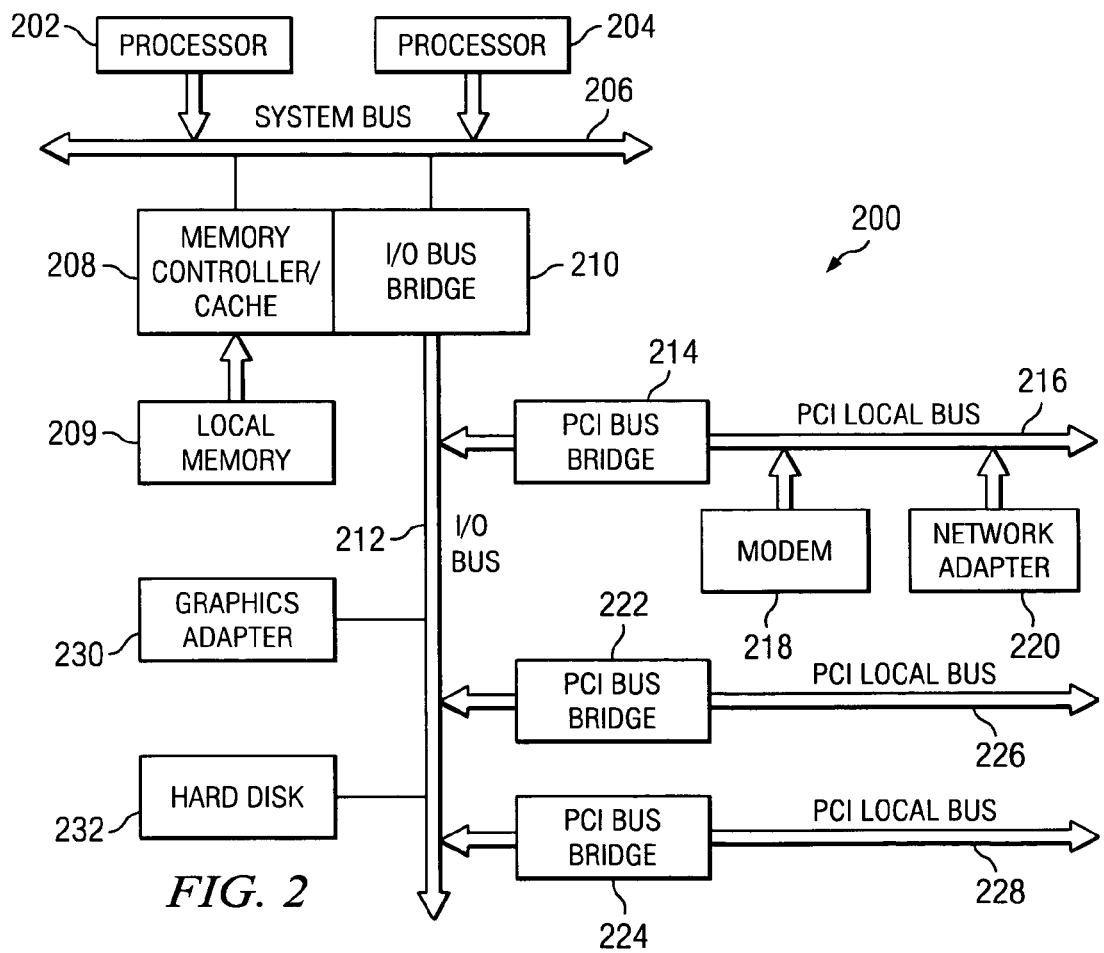
FIG. 2 is a block diagram of a data processing system that may be implemented as a server.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to 1/0 bus 212 provides an interface to PCI local bus 216. A number of modems may be connected to PCI local bus 216. Typical PCI bus implementations will support four PCI expansion slots or add-in connectors. Communications links to clients 108, 110, and in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM ESERVER PSERIES™ system, a product of International Business Machines Corporation in Armonk, New York, running the Advanced Interactive Executive (AIX) operating system or LINUX operating System.

Figure 3:
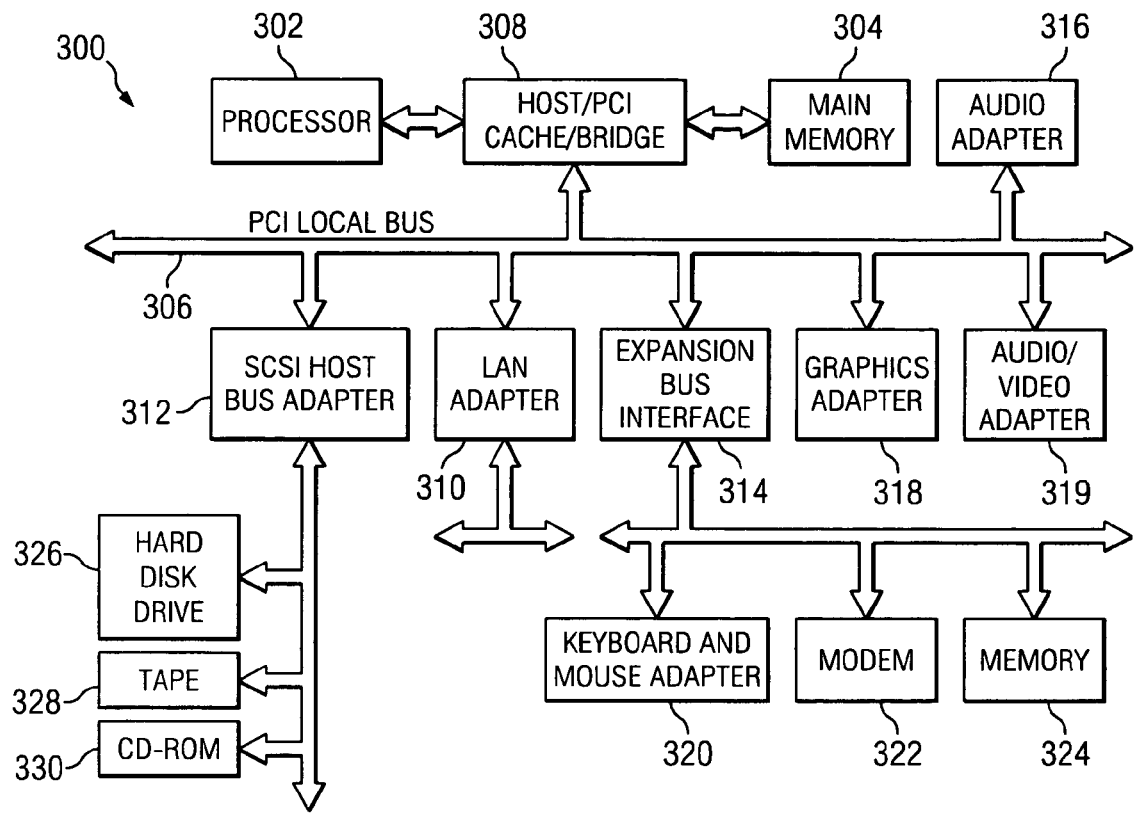
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as JAVA™ may run in conjunction with the operating system and provide calls to the operating system from JAVA™ programs or applications executing on data processing system 300. JAVA™ is a trademark of Sun Microsystems, Inc. Instructions for the operating system, the object-oriented programming systems, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. In addition, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
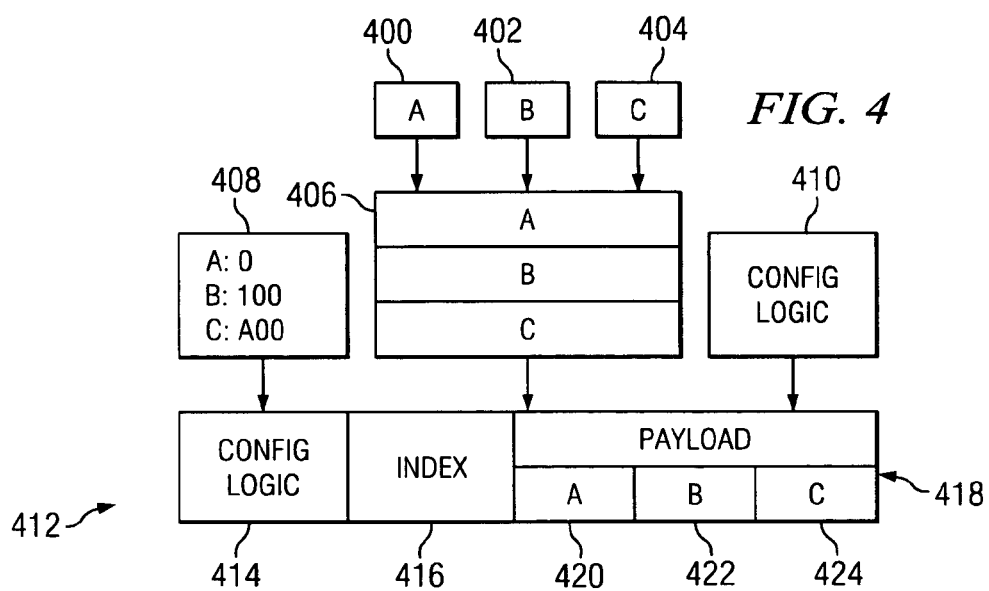
FIG. 4 is a block diagram illustrating Payload file compression and archive creation, in accordance with a preferred embodiment of the present invention.

The present invention provides a method, apparatus and computer instructions for installing a particular file contained in a compressed archive file. The particular file is directly installed onto a target data processing system without making additional copies of the particular file on the target data processing system and without intermediate expansion of the entire archive. The archive of files contains an index that indicates the locations of files within the archive of files. The archive of files also contains a configuration logic section that allows an installation program to determine which files from among all files in the archive should be installed on a data processing system and, optionally, where the files should be installed FIG. 4 is a block diagram illustrating payload file compression and archive creation, in accordance with a preferred embodiment of the present invention. The file compression and archive creation techniques shown in FIG. 4 may be implemented on a data processing system, such as server 104 in FIG. 1, or in client computers, such as clients 108, 110, and 112 in FIG. 1, server 200 in FIG. 2, or client 300 in FIG. 3.

Payload File A 400, Payload File B 402, and Payload File C 404 are compressed into archive file 406 using any one of a number of presently available compression techniques. However, in a preferred embodiment of the present invention, the compression archiving technique should preserve the logical linear integrity of each of the files in the archive. Thus, a single file in the archive should be stored in such a way that a decompression or extraction algorithm is able to decompress or extract the single file without needing to read other files in the archive file. For example, the UNIX "backup" and "restore" commands may be used to archive files in a logically linear manner.

Archive file 406 contains all of the data contained in payload files 400, 402, and 404. However, because the archive file is compressed, the individual payload files cannot be installed onto a data processing system using the archive file alone. Although FIG. 4 shows three payload files being compressed into an archive file, a vast number of payload files may be compressed into a single archive file. An archive file may be stored in any computer readable medium.

In addition, index 408 and configuration logic section 410 are also created. Index 408 contains the location or address of each file within archive file 406. Index 408 may also be referred to as a table of contents. For example, within the archive file the address of Payload File A is 0, the address of Payload File B is 100, and the address of Payload File C is A00. Thus, index 408 allows an installation program to access a particular payload file from the plurality of payload files that make up archive file 406.

Configuration logic section 410 contains computer readable code and data that allow an installation program to determine properly where and how to install a particular payload file onto a data processing system. Configuration logic section 410 can contain information that allows an installation program to determine which files should be included in a set of files to be installed on a particular data processing system. Configuration logic section 410 can also contain information regarding the order in which payload files are to be installed, how they are to be installed, or any other configuration the payload file or payload files should have when installed. Configuration logic section 410 can also contain information regarding on which clusters or blocks a payload file should be loaded in a non-volatile memory.

Configuration logic section 410 may contain additional code or data, if useful to the installation process. For example, configuration logic section 410 may contain a program that prompts a user for input regarding configuration settings, licensing, or other matters pertinent to the installation process.

Archive file 406, index 408, and configuration logic section 410 are combined into a single compressed installation image 412. Compressed installation image 412 includes configuration logic section 414, index 416, and payload section 418. Payload section 418 includes individual payload files Payload File A 420, Payload File B 422, and Payload File C 424. Compressed installation image 412 may, itself, be referred to as an archive file. Compressed installation image 412 may be used by a computer program in a computer readable medium or a computer program in a data processing system to load selectively individual payload files onto a data processing system without creating additional copies of the payload files on the data processing system.

Figure 5:
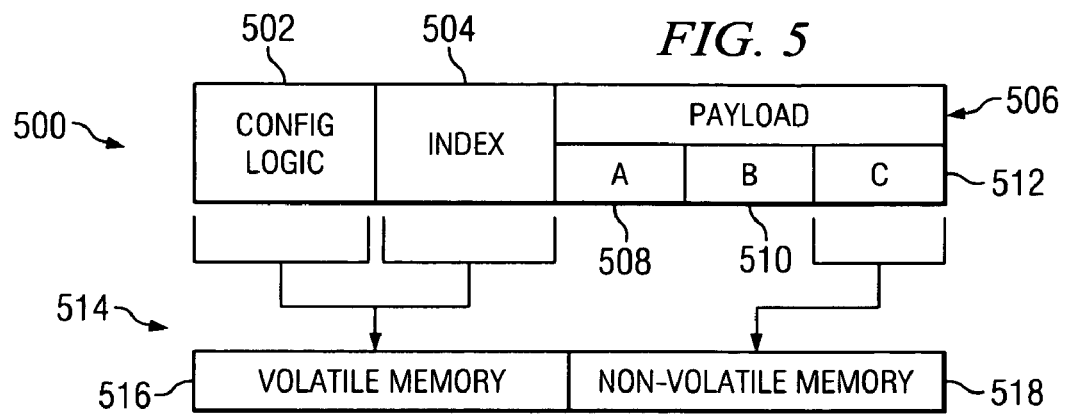
FIG. 5 is a block diagram of components used in payload file decompression, in accordance with a preferred embodiment of the present invention.

FIG. 5 is a block diagram of components used in payload file decompression, in accordance with a preferred embodiment of the present invention. Compressed installation image 500, or archive file 500, includes configuration logic section 502, index 504, and payload section 506, which itself includes Payload File A 508, Payload File B 510, and Payload File C 512. The items referred to by reference numerals 500, 502, 504, 506, 508, 510, and 512 correspond to the items referred to by reference numerals 412, 414, 416, 418, 420, 422, and 424 in FIG. 4, respectively. The description regarding compressed installation image 412 in FIG. 4 also applies to compressed installation image 500 in FIG. 5.

The mechanism of the present invention allows a particular payload file to be directly installed onto a target data processing system without copying additional copies of the particular payload file onto the data processing system. Thus, a minimum of memory is required to extract, decompress, and install a particular payload file. Note that the term "memory" can include any form of memory, including RAM, ROM, hard disk space, floppy disks, CDs, DVDs, and any other form of memory.

The mechanism of the present invention also allows a particular payload file to be directly installed without copying other files within the compressed installation image to the target data processing system. Thus, only relevant payload files are extracted, decompressed, and installed. The process of decompressing selected files may be linear, ignoring or skipping files not to be installed, or non-linear. In the latter case, if allowed by the decompression algorithm, the installation program can extract, decompress, and install payload files in any desired order.

The mechanism of the present invention also allows the installation of payload files directly from a compressed file onto a target data processing system as the payload file is being decompressed. Thus, the installation program of the present invention can install payload files from the archive file in real-time.

For example, in an illustrative embodiment, Payload File C 512 is to be installed onto non-volatile memory 518 of data processing system 514. An install program loads configuration logic section 502 and index 504 onto volatile memory 516 of data processing system 514. The installation program uses index 504 to find Payload File C 512 from within compressed installation image 500. The installation program then uses configuration logic section 502 to determine that Payload File C should be installed on non-volatile memory 518 of data processing system 514. In addition, configuration logic section contains an indication that Payload File C may be installed without installing Payload File A or Payload File B. The installation program then directly extracts Payload File C 512 from compressed installation archive 500 and installs Payload File C 512 onto non-volatile memory 518 of data processing system 514. The installation program does not copy compressed Payload File C 512 onto either form of memory, volatile memory 516 or non-volatile memory 518, before extracting Payload File C 512. Similarly, additional copies of Payload File C 512 are not copied onto either form of memory, volatile memory 516 or non-volatile memory 518. Prior art methods of decompressing files require that at least one additional copy of Payload File C 512, whether compressed or uncompressed, be placed onto one of forms, volatile memory 516 or non-volatile memory 518, of memory before installing Payload File C 512 onto data processing system 514. Other prior methods require that copies of Payload File A 508 and Payload File B 510 also be copied onto the target data processing system, even if they are not to be installed.

In another illustrative embodiment, Payload File A 508 and Payload File B 510 are to be installed onto non-volatile memory 518 of data processing system 514. Configuration logic section 502 contains data indicating that Payload File A 508 must be installed prior to installing Payload File B 510. In this case, Payload File A 508 is directly extracted and installed on non-volatile memory 518. Subsequently, Payload File B 510 is directly extracted and installed on non-volatile memory 518. The process of extracting and installing Payload File A 508 and Payload File B 510 is otherwise the same as the method described with respect to Payload File C 512. Thus, Payload File A 508 and Payload File B 510 are installed without loading additional copies of Payload File A 508 and Payload File B 512 onto either form of memory, volatile memory 516 or non-volatile memory 518, on data processing system 514.

Although the examples described above install payload files onto a non-volatile memory of a data processing system, payload files within the compressed installation image may be loaded and installed into either the volatile memory or the non-volatile memory of the data processing system. Similarly, the configuration logic section and the index may be loaded into the non-volatile memory of the data processing system. Thus, the mechanism of the present invention is flexible in terms of how and where payload files are installed on a data processing system.

Figure 6:
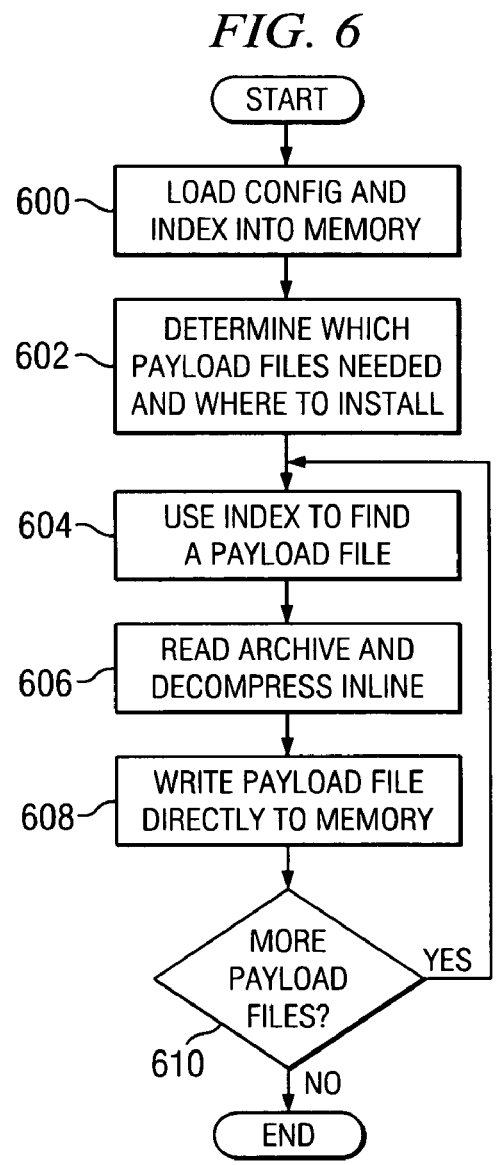
FIG. 6 is a flowchart illustrating a method of decompressing selected files directly to memory, in accordance with a preferred embodiment of the present invention.

FIG. 6 is a flowchart illustrating a method of decompressing selected files directly to memory, in accordance with a preferred embodiment of the present invention. The method shown in FIG. 6 may be implemented in a data processing system, such as server 200 in FIG. 2 or in client 300 in FIG. 3, and may be implemented with regard to the components illustrated in FIG. 4 and FIG. 5.

An installation program loads a configuration logic section and an index into a memory of a data processing system (step 600). Using the configuration logic section and the index, the installation program determines which payload files are to be installed and where the payload files will be installed (step 602). For example, using the configuration logic section the installation program determines that a particular payload file should be installed onto the data processing system. The configuration logic section also contains data indicating that the payload file should be installed on a particular cluster of non-volatile memory in a data processing system.

When extracting, decompressing, and installing a particular payload file in real-time, the installation program reads the compressed archive file until an end-of-configuration marker is read. The end-of-configuration marker is a predetermined unique binary sequence indicating the end of the configuration data and index; it therefore directly precedes the first payload file. The configuration data and index are then loaded directly into the memory of the target data processing system, preferably the volatile memory, and executed in the context of the installation program. The installation program maintains a pointer to the archive just after the configuration marker, and returns to the pointer when preparing to install the next payload file, if necessary. The addresses in the index are offsets relative to this pointer.

The installation program then uses the index to find a payload file to install on the data processing system (step 604). Thereafter, the installation program reads the archive and decompresses the payload file inline (step 606). The installation program then causes the program file to be written directly to a memory of the data processing system (step 608). Additional copies of the payload file are not copied to the data processing system. Other payload files contained in the compressed installation image are not copied to the data processing system.

A determination is then made whether additional payload files are to be installed onto the data processing system (step 610). If additional payload files are to be installed, then the process returns to step 604 and the installation program repeats step 604 through step 608 on each additional payload file. If all payload files have been installed, or if no payload files are to be installed, then the process terminates.

In the illustrative examples described above, the mechanism of the present invention provides several advantages over currently available methods and systems for installing files from compressed archive files. For example, because a minimum of space is used to install a particular payload file from a compressed archive file, data processing systems having limited memory can install programs and updates where otherwise such installation would be impossible. For example, a program contained in a compressed archive file normally requires 50 MB to install because the archive file contains many programs, even though the particular target program itself only requires 0.5 MB to install. Using the mechanism of the present invention, only about 0.5 MB is required to install the program. Thus, the mechanism of the present invention allows programs and updates to be installed on data processing systems with limited memory, such as PDAs, cell phones, and similar devices. Likewise, the mechanism of the present invention can be used on data processing systems having a large amount of total memory, but only a small amount of available memory.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method wherein a set of payload files are to be installed on a data processing system from a compressed archive comprising a plurality of files, wherein the set of payload files comprises a first payload file and a second payload file, wherein first payload file and the second payload file are contained in the compressed archive, and wherein the computer implemented method comprises:

reading an end-of-configuration marker, wherein the end-of-configuration marker comprises a predetermined binary sequence stored in a configuration logic section of the compressed archive, wherein the configuration logic section comprises an index, computer readable code, and configuration data, wherein the index, computer readable code, and configuration data allow an installation program to determine where and how to install the first payload file to the data processing system, and wherein the end-of configuration marker indicates an end of the configuration data and the index;

loading the configuration data and the index into a first memory of the data processing system, wherein the configuration data determines which file among the plurality of files is the first payload file, and wherein the index describes a location of the first payload file in the compressed archive;

finding the first payload file in the compressed archive using the index;

decompressing the first payload file inline;

writing the first payload file directly to a second memory of the data processing system, wherein writing the first payload file is performed as the first payload file is decompressed, and wherein writing is performed without making an additional copy of the first payload file on the data processing system and without intermediate expansion of the compressed archive;

maintaining a pointer to the compressed archive just after the end-of-configuration marker;

returning to the pointer when preparing to install the second payload file;

finding the second payload file in the compressed archive using the index;

decompressing the second payload file inline;

writing the second payload file directly to the second memory of the data processing system, wherein writing the second payload file is performed as the second payload file is decompressed, and wherein writing is performed without making an additional copy of the second payload file on the data processing system and without intermediate expansion of the compressed archive; and selectively choosing, before writing the first payload file and before writing the second payload file, an order in which the first payload file and the second payload file is decompressed and written to the second memory.

2. The computer implemented method of claim 1 wherein addresses in the index are offsets relative to the pointer.

3. The computer implemented method of claim 1 wherein the data processing system is one of a personal digital assistant and a mobile phone.

4. The computer implemented method of claim 1 wherein the first memory comprises a volatile memory and wherein the second memory comprises a non-volatile memory.

* * * * *